United States Patent
Tottori et al.

[11] 3,906,102
[45] Sept. 16, 1975

[54] CERTAIN 3,5-DICHLOROPHENYL COMPOUND AS AN ANTIFUNGAL AGENT

[75] Inventors: Nobumasa Tottori; Yasuhisa Asano, both of Minoo; Minoru Ueda; Osamu Kirino, both of Takarazuka; Shigehiro Ooba, Kobe; Akira Fujinami, Ashiya; Toshiaki Ozaki, Toyonaka, all of Japan

[73] Assignee: Sumitomo Chemical Company, Limited, Japan

[22] Filed: Nov. 1, 1973

[21] Appl. No.: 411,838

[30] Foreign Application Priority Data
Nov. 2, 1972  Japan................. 47-109890

[52] U.S. Cl. ................................ 424/274
[51] Int. Cl.² .......................... A01N 9/22
[58] Field of Search.............. 424/274; 260/326

[56] References Cited
UNITED STATES PATENTS
3,261,845  7/1966  Bockstahler.................. 424/274

*Primary Examiner*—V. D. Turner
*Attorney, Agent, or Firm*—Stewart and Kolasch, Ltd.

[57] ABSTRACT

An agricultural composition which comprises as an active ingredient a compound represented by the following formula:

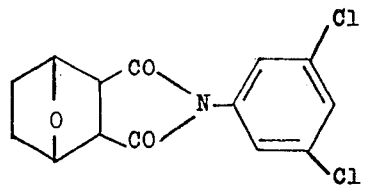

and which shows a strong anti-fungal activity against phyto-pathogenic fungi of Sclerotinia and Botrytis genera without any appreciable toxicity to crop plants or to mammals and fish.

6 Claims, No Drawings

CERTAIN 3,5-DICHLOROPHENYL COMPOUND AS AN ANTIFUNGAL AGENT

The present invention relates to an agricultural composition. More particularly, it relates to an agricultural composition comprising as an active ingredient the 3,5-dichlorophenyl compound represented by the following formula:

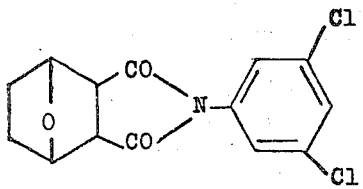

which exhibits a remarkable anti-fungal activity against phyto-pathogenic fungi, particularly of the Sclerotinia and Botrytis genera, without any appreciable toxicity to crop plants or to mammals and fish.

The said 3,5-dichlorophenyl compound [I] is known and described to be useful as a veterinary medicament [cf. U.S. Pat. Nos. 3,215,597 and 3,261,845]. Further, it is described that N-4-fluorophenyl-3,6-epoxyhexahydrophthalimide similar to the 3,5-dichlorophenyl compound [I] in chemical structure has an acaricidal activity [cf. U.S. Pat. No. 3,261,845]. However, no literature has ever suggested the practical use of the 3,5-dichlorophenyl compound [I] as an active ingredient in agricultural compositions, particularly in fungicidal compositions against phyto-pathogenic fungi.

As the result of extensive studies, it has now been found that the 3,5-dichlorophenyl compound [I] exhibits a remarkable anti-fungal activity against phyto-pathogenic fungi, particularly of the Sclerotinia and Botrytis genera. It has also been found that the 3,5-dichlorophenyl compound does not cause any phytotoxicity on crop plants when applied in an amount which is sufficient to exert anti-fungal activity. It has further been found that the 3,5-dichlorophenyl compound [I] shows an extremely low toxicity with regard to mammals and fish.

In this connection, it should be noted that a number of compounds closely related to the 3,5-dichlorophenyl compound [I] in chemical structure have been known but their anti-fungal activity is so weak as to preclude any practical application.

According to the present invention, there is provided an agricultural composition, especially a fungicidal composition in a preparation form such as dusts, wettable powders, emulsifiable concentrates, sprays, aerosols, fumigants, pellets and granules, which comprises the 3,5-dichlorophenyl compound [I] alone or in association with one or more gaseous, solid or liquid carriers of the types commonly used in fungicidal compositions. Besides the 3,5-dichlorophenyl compound [I], the composition may contain one or more known fungicides (e.g. Blasticidin S, Kasugamycin, Polyoxin, Cellocidin, Chloramphenicol, Validamycin, Streptomycin, Griseofulvin, cycloheximide, pentachloronitrobenzene, pentachlorophenol and its salts, 2,6-dichloro-4-nitroaniline, zinc ethylenebis(dithiocarbamate), zinc dimethyldithiocarbamate, manganese ethylenebis(dithiocarbamate), bis(dimethylthiocarbamoyl) disulfide, 2,4,5,6-tetrachloroisophthalonitrile, 2,3-dichloro-1,4-naphthoquinone, tetrachloro-p-benzoquinone, tetrachlorophthalide, p-dimethylaminobenzenediazosodium sulfonate, 2-(1-methylheptyl)-4,6-dinitrophenylcrotonate, 2-heptadecylimidazoline acetate, 2,4-dichloro-6-(o-chloroanilino)-S-triazine, dodecylguanidine acetate, 6-methyl-2,3-quinoxalinedithiol cyclic S,S-dithiocarbonate, N-trichloromethylthio-4-cyclohexene-1,2-dicarboximide, N-(1,1,2,2-tetrachloroethylthio)-4-cyclohexene-1,2-dicarboximide, 3-(3,5-dichlorophenyl)-5,5-dimethyloxazolidinedione-2,4, N-(3,5-dichlorophenyl)-maleimide, N-(3,5-dichlorophenyl)-succinimide, N-(3,5-dichlorophenyl)-itaconimide, 2,3-dihydro-5-carboxanilide, 6-methyl-1,4-oxazine, 1-(N-butylcarbamoyl)-2-methoxycarbonylaminobenzimidazole, 2-(4'-thiazolyl)-benzimidazole, 1,2-bis(3-ethoxycarbonyl-2-thioureido)-benzene, 1,2-bis(3-methoxycarbonyl-2-thioureido)-benzene, 2-amino-5-mercaptothiadiazole, 2-aminothiadiazole, O-butyl-S-benzyl-S-ethylphorodithioate, O-ethyl-S,S-diphenylphosphorodithioate, O,O-diisopropyl-S-benzyophosphorothioate, 0,0-dimethyl-O-(3-methyl-4-nitrophenyl)-phosphorothioate, S-[1,2-bis(ethoxycarbonyl)ethyl]-O,O-dimethylphosphorodithioate, 0,0-dimethyl-S-(N-methylcarbamoylmethyl)-phosphorodithioate, 0,0-diethyl-O-(2-isopropyl-6-methyl-4-pyrimidyl)-thiophosphate, 1,3-bis(carbamoylthio)-2-(N,N-dimethylamino)propane hydrochloride, 3,4-dimethylphenyl-N-methylcarbamate, 1-naphthyl-N-methylcarbamate, 2-chloro-4,6-bis(ethylamino)-S-triazine, 2,4-dichlorophenoxyacetic acid and its salts and esters, 2-methyl-4-chlorophenoxyacetic acid and its salts and esters, 2,4-dichlorophenyl-4-nitrophenyl ether, N-(3,4-dichlorophenyl)-propionamide, 3-(3',4'-dichlorophenyl)-1,1-dimethylurea, 4-chlorobenzyl-N,N-dimethylthiol carbamate, 1,1'-dimethyl-4,4'-bipyridium dichloride, 2,4,-6-trichlorophenyl-4'-nitrophenyl ether, N'-(2-methyl-4-chlorophenyl)-N,N-dimethylformamidine, N,N-diallyl-2-chloroacetamide, ethyl(or cyclohexyl) β-(2,4-dichlorophenoxy)-acrylate, S-n-heptyl-S'-(p-t-butylbenzyl)-N-(3'-pyridyl)-imidodithiocarbonate, S-n-butyl-S'-(p-t-butylbenzyl)-N-(3-pyridyl)-imidodithiocarbonate, etc.). The composition may also contain one or more materials known to be active as bactericides, insecticides, nematocides, acaricides, herbicides, fertilizers, soil conditioners or plant growth regulators.

Typical examples of the agricultural composition according to this invention are:

a. Dusts obtained by dispersing the 3,5-dichlorophenyl compound [I] as the active ingredient in a concentration of 0.1 to 30 percent by weight in an inert carrier (e.g. talc, diatomaceous earth, wood flour, clay).

b. Wettable powders obtained by dispersing the 3,5-dichlorophenyl compound [I] as the active ingredient in a concentration of 0.2 to 80 percent by weight in an inert adsorbent carrier (e.g. diatomaceous earth) together with a wetting and/or dispersing agent such as an alkali metal salt of a long aliphtic sulfate chain, a partly neutralized sulfuric acid derivative of either a petroleum oil or a natural occurring glycerine or a condensation product of an alkylene oxide with an organic acid.

c. Emulsifiable concentrates obtained by dispersing the 3,5-dichlorophenyl compound [I] as the active ingredient in a concentration of 1 to 50 percent by weight in an organic solvent (e.g. dimethylsulfoxide) plus a wetting and/or dispersing agent such as an alkali metal salt of a long aliphatic sulfate chain, a partly neutralized sulfuric acid derivative of either a petroleum oil or a natural occurring glycerine or a condensation product of an alkylene oxide with an organic acid.

d. Compositions of the 3,5-dichlorophenyl compound [I] formulated in the manner commonly employed in the art for the preparation of fungicidal fumigants.

More specific examples of the agricultural composition of this invention are shown below. In these examples, parts and % are by weight.

EXAMPLE 1

Preparation of wettable powder:

The 3,5-dichlorophenyl compound [I], i.e. N-(3',5'-dichlorophenyl)-7-oxabicyclo(2,2,1)heptane-2,3-dicarboximide (M.P. 154° – 155°C), (50 parts), a wetting agent (an alkylbenzenesulfonate) (5 parts) and diatomaceous earth (45 parts) are crushed and mixed well to form a wettable powder preparation containing 50 % of the active ingredient. The wettable powder preparation is diluted with water and then applied.

EXAMPLE 2

Preparation of dust:

The 3,5-dichlorophenyl compound [I] (3 parts) and clay (97 parts) are crushed and mixed well to form a dust preparation containing 3 percent of the active ingredient. The dust preparation is applicable as such.

EXAMPLE 3

Preparation of emulsifiable concentrate:

The 3,5-dichlorophenyl compound [I] (10 parts), dimethylformamide (70 parts), toluene (10 parts) and an emulsifier (polyoxyethylenedodecylphenol ether) (10 parts) are mixed well to form an emulsifiable concentrate preparation containing 10 percent of the active ingredient. The emulsifiable concentrate preparation is diluted with water and then applied.

EXAMPLE 4

Preparation of fumigant:

The 3,5-dichlorophenyl compound [I] (90 parts) a nitrite (3 parts), wood flour (2 parts) and diatomaceous earth (5 parts) are pulverized and mixed well to form a fumigant preparation containing 90 percent of the active ingredient. The fumigant preparation is applied by fumigating on a heating fumigator.

EXAMPLE 5

Preparation of complex wettable powder:

The 3,5-dichlorophenyl compound [I] (40 parts), S-n-butyl-S'-(p-t-butylbenzyl)-N-(3-pyridyl)-dithiocarbonate (10 parts), diatomaceous earth (45 parts) and a wetting agent (calcium ligninsulfonate) (5 parts) are pulverized and mixed well to form a complex wettable powder preparation containing 50 percent of the active ingredients. The complex wettable powder preparation is diluted with water and then applied.

Some of the test results which support the anti-fungal activity of the 3,5-dichlorophenyl compound [I] are shown below.

The known compounds used in the following tests for comparison are as follows:

| Compound No. | Structure | Remarks |
| --- | --- | --- |
| 1 | | Disclosed in U.S. patents 3,215,597 and 3,261,845 |
| 2 | | Disclosed in U.S. patents 3,215,597 and 3,261,845 |
| 3 | | Disclosed in U.S. patent 3,261,845 |
| 4 | | Disclosed in U.S. patent 3,261,845 |
| 5 | | Disclosed in U.S. patent 3,261,845 |

| Compound No. | Structure | Remarks |
|---|---|---|
| 6 | 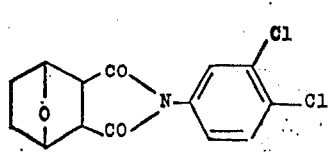 | Disclosed in U.S. patent 3,261,845 |
| 7 | 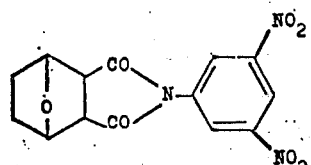 | Disclosed in U.S. patent 3,261,845 |
| 8 | 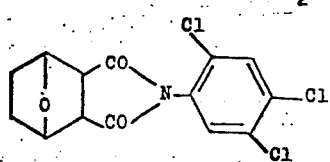 | Disclosed in U.S. patent 3,261,845 |
| 9 | 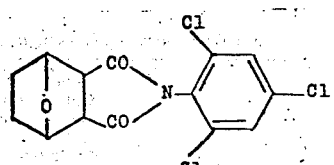 | Disclosed in U.S. patent 3,261,845 |

TEST 1

A test compound in wettable powder form was diluted with water and applied to kidney bean seedlings cultured in pots of 15 cm in diameter and grown up to the three trifoliate stage at a dose of 10 ml of the dilution per pot. After four hours, a mycelium-disc-inoculum of *Sclerotinia sclerotiorum* (diameter, 5 mm) was inoculated on the leaves. The infectious area at the leaves was observed 3 days thereafter, and the size of the diseased spot was measured. The degree of damage was calculated according to the following equation:

$$\text{Degree of damage} = \frac{\Sigma(\text{Infection index} \times \text{Number of leaves})}{\text{Total number of leaves}}$$

wherein the infectious index was determined on the following criteria:

| Infectious index | Infectious area |
|---|---|
| 0 | None |
| 1 | Up to 1/5 of the total area of the inoculated leaf |
| 2 | More than 1/5 and up to 2/5 of the total area of the inoculated leaf |
| 3 | More than 2/5 and up to 3/5 of the total area of the inoculated leaf |
| 4 | More than 3/5 and up to 4/5 of the total area of the inoculated leaf |
| 5 | More than 4/5 of the total area of the inoculated leaf |

The degree of disease-preventing effect was calculated according to the following equation:

$$\text{Degree of disease-preventing effect} = \frac{\left(\begin{array}{c}\text{Size of diseased spots}\\\text{in untreated plot}\end{array}\right) - \left(\begin{array}{c}\text{Size of diseased spots}\\\text{in treated plot}\end{array}\right)}{\left(\begin{array}{c}\text{Size of diseased spots}\\\text{in untreated plot}\end{array}\right)} \times 100$$

The results are shown in Table 1, from which it is clear that the 3,5-dichlorophenyl compound [I] has a stronger anti-fungal activity than the analogous compounds such as the corresponding monochlorinated, dichlorinated, trichlorinated and dinitrated compounds.

Table 1

| Test compound | Concentration (ppm) | Second leaf | | Third leaf | |
|---|---|---|---|---|---|
| | | Degree of damage | Degree of disease-preventing effect (%) | Degree of damage | Degree of disease-preventing effect (%) |
| Present invention | | | | | |
| Compound [I] | 500 | 0.0 | 100 | 0.0 | 100 |
| | 100 | 0.0 | 100 | 0.0 | 100 |
| Comparison | | | | | |
| Compound No. 1 | 500 | 4.9 | 2 | 4.9 | 2 |
| | 100 | 5.0 | 0 | 5.0 | 0 |
| Compound No. 2 | 500 | 1.3 | 74 | 1.9 | 62 |
| | 100 | 4.6 | 8 | 4.9 | 2 |

Table 1 – Continued

| Test compound | Concentration (ppm) | Second leaf | | Third leaf | |
|---|---|---|---|---|---|
| | | Degree of damage | Degree of disease-preventing effect (%) | Degree of damage | Degree of disease-preventing effect (%) |
| Compound No. 3 | 500 | 5.0 | 0 | 5.0 | 0 |
| | 100 | 5.0 | 0 | 5.0 | 0 |
| Compound No. 4 | 500 | 5.0 | 0 | 5.0 | 0 |
| | 100 | 5.0 | 0 | 5.0 | 0 |
| Compound No. 5 | 500 | 4.9 | 2 | 5.0 | 0 |
| | 100 | 5.0 | 0 | 5.0 | 0 |
| Compound No. 6 | 500 | 4.8 | 4 | 4.9 | 2 |
| | 100 | 5.0 | 0 | 5.0 | 0 |
| Compound No. 7 | 500 | 4.7 | 6 | 4.7 | 6 |
| | 100 | 5.0 | 0 | 5.0 | 0 |
| Compound No. 8 | 500 | 4.9 | 2 | 5.0 | 0 |
| | 100 | 5.0 | 0 | 5.0 | 0 |
| Compound No. 9 | 500 | 4.9 | 2 | 4.9 | 2 |
| | 100 | 5.0 | 0 | 5.0 | 0 |
| Untreated | — | 5.0 | — | 5.0 | — |

TEST 2

Kidney bean seedlings cultured in pots of 9 cm in diameter and grown up to the first trifoliate stage (five pots per plot) were exposed to fumes of a test compound, said fumes being produced on a heating fumigator. Exposure was made for 15 hours in a space enclosed by vinyl sheets, and then the vinyl sheets were removed. Besides, the plants as above were subjected to foliage treatment with a 1,000 fold dilution of a 30 percent wettable powder of the test compound at a dose of 100 liters of the dilution per 10 are. After seventeen hours from the treatments in both cases, a mycelium-disc-inoculum of *Sclerotinia sclerotiorum* was inoculated on the surface and the reverse of the leaves. The infectious area at the leaves was observed 4 days thereafter, and the degree of damage was calculated according to the following equation:

$$\text{Degree of damage} = \frac{\Sigma\left(\text{Infection index} \times \text{Number of leaves}\right)}{\text{Total number of leaves}}$$

wherein the infectious index was determined on the following criteria:

| Infectious index | Infectious area |
|---|---|
| 0 | None |
| 1 | Only around the inoculated parts |
| 2 | Up to 1/5 of the total area of the inoculated leaf |
| 3 | More than 1/5 and up to 2/5 of the total area of the inoculated leaf |
| 4 | More than 2/5 and up to 3/5 of the total area of the inoculated leaf |
| 5 | More than 3/5 of the total area of the inoculated leaf |

The results are shown in Table 2, from which it can be understood that the 3,5-dichlorophenyl compound [I] exerts an excellent anti-fungal activity not only when applied in a wettable powder form but also when applied in a fumigant form.

Table 2

| Plot | Test compound | Dose | Degree of damage | |
|---|---|---|---|---|
| | | | Inoculated on surface | Inoculated on reverse |
| Fumigation | Compound [I] | 500 mg/m³ | 0.0 | 0.0 |
| | | 100 mg/m³ | 0.0 | 0.4 |
| | | 25 mg/m³ | 0.0 | 1.0 |
| Foliage | Compound [I] | 100 L/10 a (as 1000 fold dilution of 30 % wettable powder) | 0.0 | 0.0 |
| Untreated | — | — | 5.0 | 5.0 |

TEST 3

Cucumber seedlings were cultured in pots of 9 cm in diameter and, when grown up to the first trifoliate stage, the leaf was trimmed. A test compound in wettable powder form was diluted with water and applied to the seed leaf cotyledon of the plants at a dose of 10 ml of the dilution per pot. After four hours, potato juice agar pieces of *Botrytis cinerea* (diameter, 5 mm) were inoculated on the leaves. The infectious area at the leaves was observed 4 days thereafter, and the size of the diseased spot was measured. The degree of damage and the degree of disease-preventing effect were calculated as in Test 1.

The results are shown in Table 3, from which it is apparent that the 3,5-dichlorophenyl compound [I] has a stronger anti-fungal activity than the analogous compounds such as the corresponding monochlorinated, dichlorinated, trichlorinated and dinitrated compounds.

Table 3

| Test compound | Concentration (ppm) | Degree of damage | Degree of disease-preventing effect (%) |
| --- | --- | --- | --- |
| Present invention | | | |
| Compound [I] | 200 | 0.0 | 100 |
| Comparison | | | |
| Compound No. 1 | 200 | 5.0 | 0 |
| Compound No. 2 | 200 | 3.4 | 32 |
| Compound No. 3 | 200 | 4.9 | 2 |
| Compound No. 4 | 200 | 5.0 | 0 |
| Compound No. 5 | 200 | 4.7 | 6 |
| Compound No. 6 | 200 | 4.9 | 2 |
| Compound No. 7 | 200 | 4.8 | 4 |
| Compound No. 8 | 200 | 5.0 | 0 |
| Compound No. 9 | 200 | 5.0 | 0 |
| Untreated | — | 5.0 | — |

As understood from the above test results, the 3,5-dichlorophenyl compound [I] is useful for the control and prevention of such plant diseases as Sclerotinia rot and Botrytis gray mold of vegetables and field crops.

The 3,5-dichlorophenyl compound [I] may be applied as such. From the practical viewpoint, however, it is usually employed in the form of compositions in association with any agriculturally acceptable inert carrier or diluent as well as any surface active agent or wetting agent. The concentration of the active ingredient in the compositions may be from about 0.1 to 90 percent by weight, although such is not essential.

What is claimed is:

1. A method for preventing plat diseases caused by phyto-pathogenic fungi selected from the group consisting of the genera Sclerotinia and Botrytis which comprises applying to said fungi a fungicidally effective amount of a 3,5-dichlorophenyl compound of the formula:

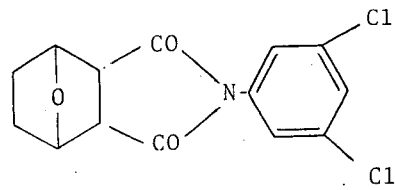

2. The method according to claim 1, wherein the 3,5-dichlorophenyl compound is applied to said fungi in the form of a composition comprising said compound and an inert carrier.

3. The method according to claim 2, wherein the concentration of the 3,5-dichlorophenyl compound in said composition is 0.1 to 90 percent by weight.

4. The method according to claim 2, wherein said inert carrier is an organic solvent for the 3,5-dichlorophenyl compound.

5. The method according to claim 3, wherein the phyto-pathogenic fungus is *Sclerotinia sclerotiorum*.

6. The method according to claim 3, wherein the phyto-pathogenic fungus is *Botrytis cinerea*.

* * * * *